W. F. BOOCK.
CONVERTIBLE SEAT AND BED STRUCTURE FOR VEHICLES.
APPLICATION FILED JUNE 23, 1914.
1,229,871.
Patented June 12, 1917.
2 SHEETS—SHEET 1.
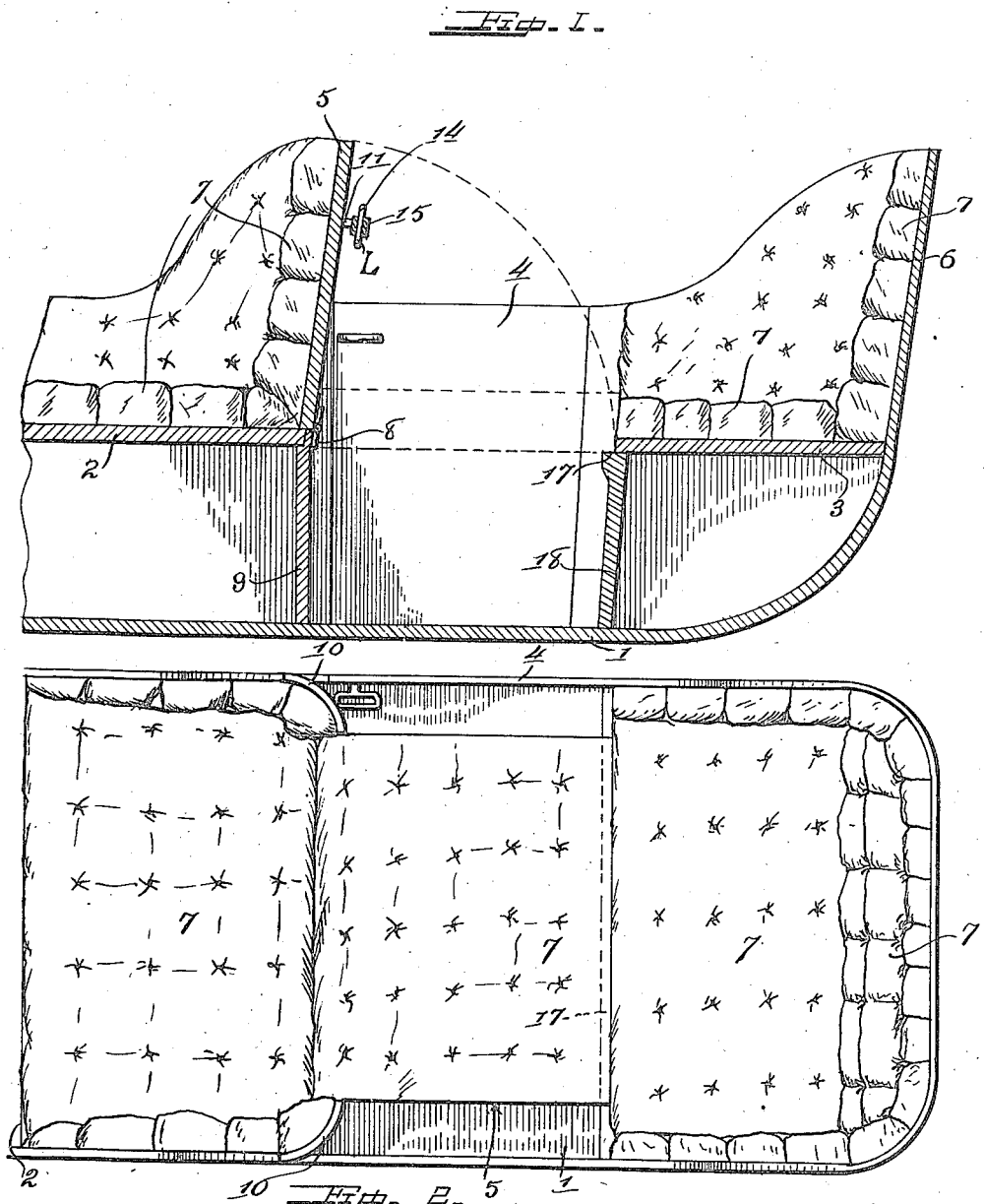

W. F. BOOCK.
CONVERTIBLE SEAT AND BED STRUCTURE FOR VEHICLES.
APPLICATION FILED JUNE 23, 1914.
1,229,871.
Patented June 12, 1917.
2 SHEETS—SHEET 2.
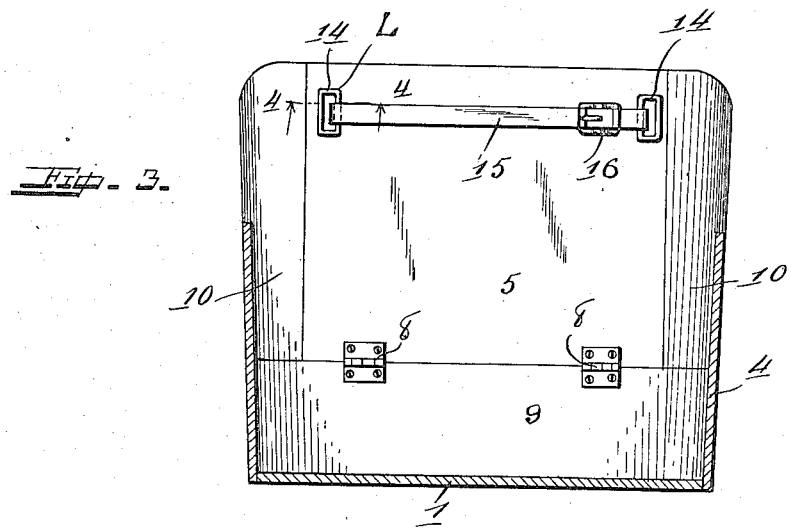
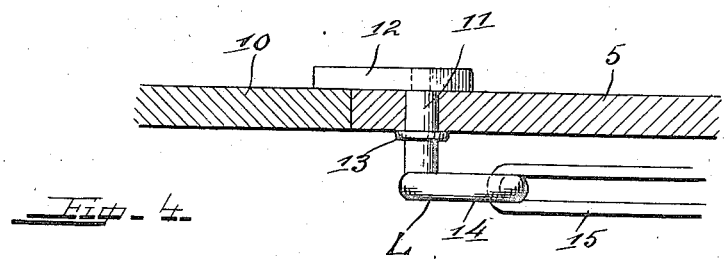
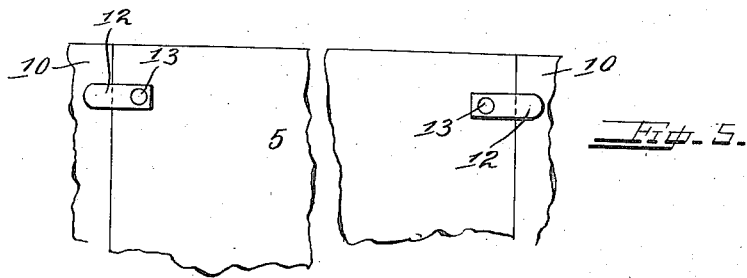
Inventor
Wilhelm F. Boock.
Witnesses
Edw. S. Hall.
By Richard Owen.
Attorney

UNITED STATES PATENT OFFICE.

WILHELM F. BOOCK, OF PIPESTONE, MINNESOTA.

CONVERTIBLE SEAT AND BED STRUCTURE FOR VEHICLES.

1,229,871.   Specification of Letters Patent.   Patented June 12, 1917.

Application filed June 23, 1914. Serial No. 846,851.

*To all whom it may concern:*

Be it known that I, WILHELM F. BOOCK, a citizen of the United States, residing at Pipestone, in the county of Pipestone and State of Minnesota, have invented certain new and useful Improvements in Convertible Seat and Bed Structures for Vehicles, of which the following is a specification.

My invention relates to a convertible seat and bed structure.

The invention aims to provide a structure adapted to normally form a seat having a back rest, particularly forming a seat for an automobile or other vehicle, which structure may be adjusted to serve as a bed or to convert the vehicle into an emergency ambulance; to provide the structure essentially as a seat having a back rest to be fastened in a horizontal position and in an upright position; to provide suitable supporting and fastening means for the back rest; to provide the means to fasten the back rest in upright position as one or more turnable fasteners normally held against turning movement by means of a hand-hold connecting element detachably fastened to the fastener or fasteners, and at the same time to provide a structure of this nature that is simple, will prove durable and efficient in use and is capable of manufacture at minimum cost.

With the foregoing and additional objects in view as will become apparent as the description progresses hereinafter, the invention consists in certain novel features of construction, combination and arrangement of parts.

In connection with the said description reference is to be had to the accompanying drawings illustrating the present preferred embodiment, in which drawings:—

Figure 1 is a vertical sectional view taken through an automobile body having the improved structure arranged so as to serve as a seat;

Fig. 2 is a plan view of the same parts but with the structure serving as a bed;

Fig. 3 is a vertical cross sectional view of the automobile body taken on a line passing through rear door and looking toward the front of the vehicle;

Fig. 4 is a cross sectional view on an enlarged scale, taken horizontally through the back of the front seat together with a stationary part and showing the latch means in plan, and Fig. 5 is a detail view illustrating the adjustable back rest and supporting and fastening parts fragmentarily.

Referring specifically to the drawings wherein like reference characters designate like or similar parts, 1 designates the floor of an automobile or other vehicle. Above the floor is suitably fastened a front seat 2 and a rear seat 3, the seats being spaced apart as usual and a side extremity of the space intermediate same being provided with a door 4. The back rest provided for the front seat is shown at 5. Rear seat 3 as usual, is preferably provided with a back rest as at 6. The several back rests and several seats are preferably upholstered as seen at 7.

Reverting to the back rest 5, the same extends transversely of the car body and is pivoted by means of hinges at 8 to an upstanding transverse board 9. Due to the provision of the hinges 8, said back rest 5 is capable of swinging movement in the arc shown in dotted lines in Fig. 1.

Fig. 1 illustrates the element 5 when in position serving as a back rest. When thus serving as a back rest, element 5 is fastened in a substantially vertical plane, though slightly inclined, through the engagement of latches L with keeper members 10, the latter being in the form of upstanding wooden strips.

The latches L comprise a shank 11 turnably mounted in the back rest 5 having fastened thereto at its inner end, the latch bolt 12 proper. Upon the side of the shank 11 opposite to the bolt 12, is provided a boss 13 to prevent undue lateral movement of the latch, and on the shank 11 beyond the boss 13 is a rectangular open handle 14 which extends at a right angle to the shank. The two handles 14 extend toward each other.

An essential feature of the invention is the provision of means to normally maintain the latches locked against movement and which means is designed to pass through the eyes or openings of the handles 14. Said means may take the form of a belt 15 made of leather and having its end joined as by a separable buckle or other fastening at 16. When this belt is tightly fastened to the handles 14 as seen in Fig. 3, turning movement of the latches L cannot occur accidentally or at all prior to slackening or removal of the belt. The belt serves as a support or rack for lap robes or other articles.

When the article serves as a bed or converts the machine into an emergency ambulance, back rest 5 rests on a ledge or support 17 so as to be in a horizontal plane and in alinement with the seats 2 and 3. Said ledge is provided on a transverse upstanding board 18 which serves to support the seat 3 at the front end.

It will be realized that when the structure is built into an automobile or other vehicle, while the parts are in the position shown in Fig. 1 and the latches fastened by means of the belt 15, the structure serves as an ordinary seat. Should it be desired to form a bed or convert the structure into an emergency ambulance, the strap or belt 15 is unbuckled and disengaged from the handles 14. Thereupon back rest 5 can be lowered in the path of the arc shown by the dotted lines in Fig. 1 until it rests on the ledge 17, the latter position being illustrated in Fig. 2. In this position the back rest 5 and seats 2 and 3 will be in the same horizontal plane or in alinement. The upholstering on the back rest 6 will serve as a pillow to some extent.

It is to be understood that I have shown only the preferred embodiment of my invention. Therefore it is to be realized that changes in the details of construction, arrangement and combination of the parts may be made without departing from the spirit and scope of the invention.

Having thus described my invention what I claim is:—

1. In combination with a back rest, a plurality of movable devices to secure said back rest against movement, a taut elongated element engaging and bridging said devices and preventing movement thereof, said element dually functioning as a fastening for said devices and as a rack, and means to permit slackening of said element to permit movement of said devices.

2. In combination with a back rest, a plurality of turnable latches to secure said back rest against movement, an elongated flexible belt, said latches having open handles, said belt extending through the openings of said handles, said belt dually functioning as a fastening to secure said devices against turning and as a rack, and a separable fastening to connect the ends of said belt.

In testimony whereof I affix my signature in presence of two witnesses.

WILHELM F. BOOCK.

Witnesses:
E. J. FELDMAN,
W. T. MORGAN.